US005277799A

United States Patent [19]

Bransch

[11] Patent Number: 5,277,799

[45] Date of Patent: Jan. 11, 1994

[54] PUMP COMPARTMENT SCREENING ARRANGEMENT FOR A TANK

[76] Inventor: Edward J. Bransch, 1760 Old Plank Rd., Milford, Mich. 48042

[21] Appl. No.: 829,359

[22] Filed: Jan. 23, 1992

Related U.S. Application Data

[63] Continuation-in-part of Ser. No. 759,522, Sep. 13, 1991, abandoned.

[51] Int. Cl.[5] .......... B01D 25/02

[52] U.S. Cl. .......... 210/155; 210/162; 210/231; 210/258; 210/323.1

[58] Field of Search .......... 210/153, 155, 162, 167, 210/169, 230, 231, 232, 238, 227, 228, 258, 322, 323.1, 335, 416.1, 416.2

[56] References Cited

U.S. PATENT DOCUMENTS 3,868,324 2/1975 Taylor et al. .......... 210/158

*Primary Examiner*—Frank Sever

*Attorney, Agent, or Firm*—John R. Benefiel

[57] ABSTRACT

A screening arrangement is disclosed for protecting the pump compartment of a tank from the entrance of debris including a holder frame mounted in the tank, slidably receiving therein a pair of screens aligned with each other. The outside screen is removed for cleaning, replaced behind the other screen after cleaning to provide constant protection. A debris collecting trough is provided at the bottom of each screen. A ramp located at the bottom of the holder frame assists in indexing of the other screen as the cleaned screen is removed.

8 Claims, 3 Drawing Sheets

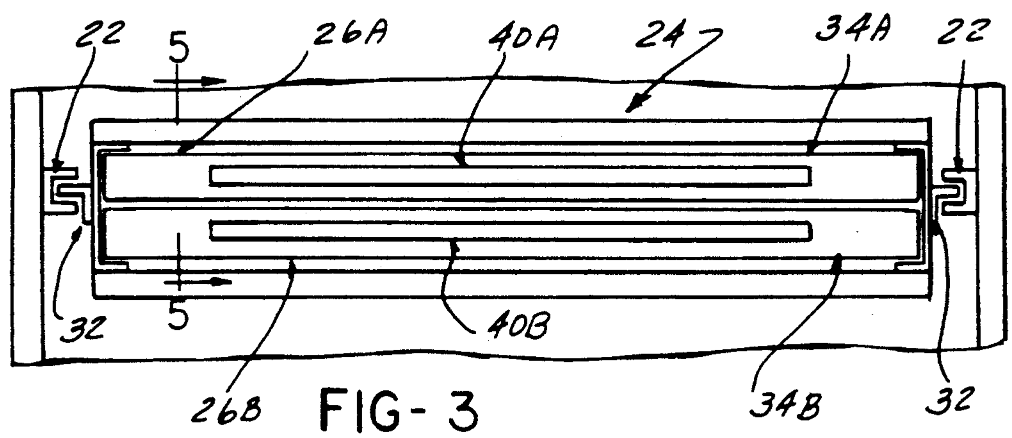
FIG-3
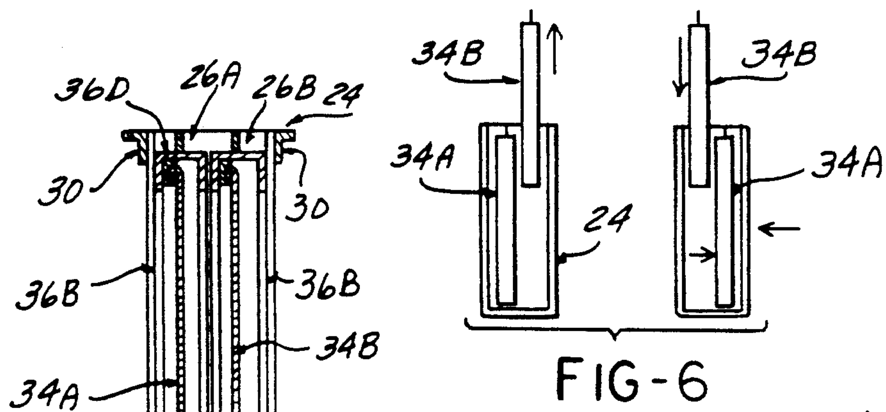
FIG-6
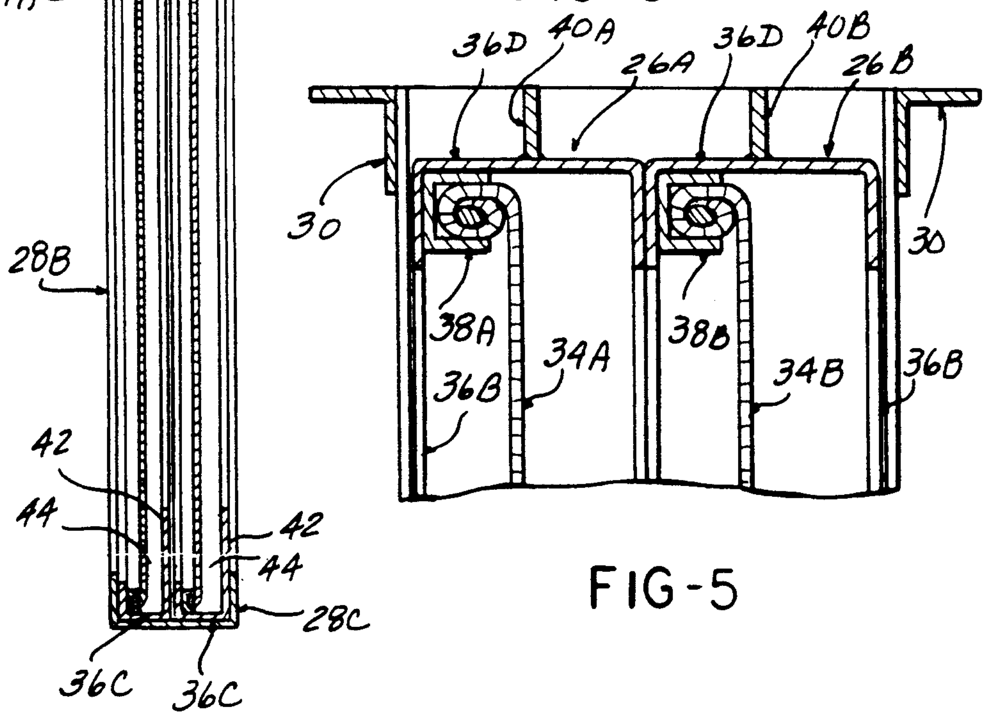
FIG-5
FIG-4

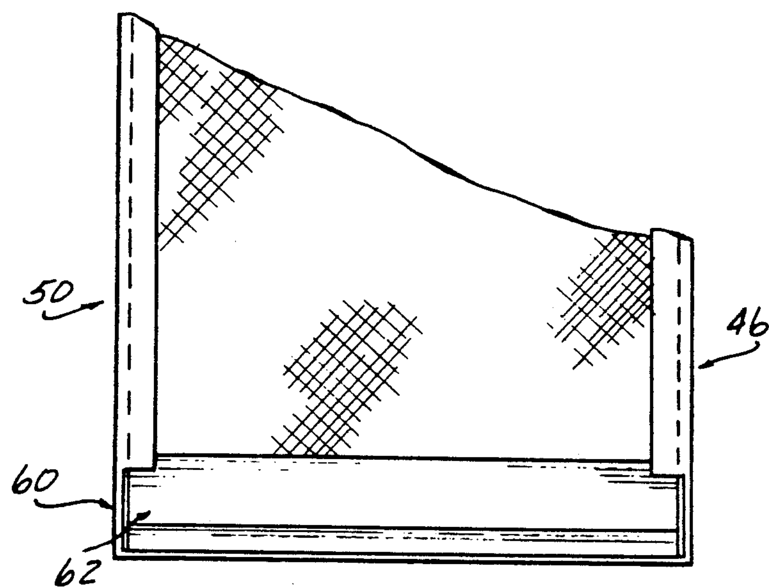
FIG-9
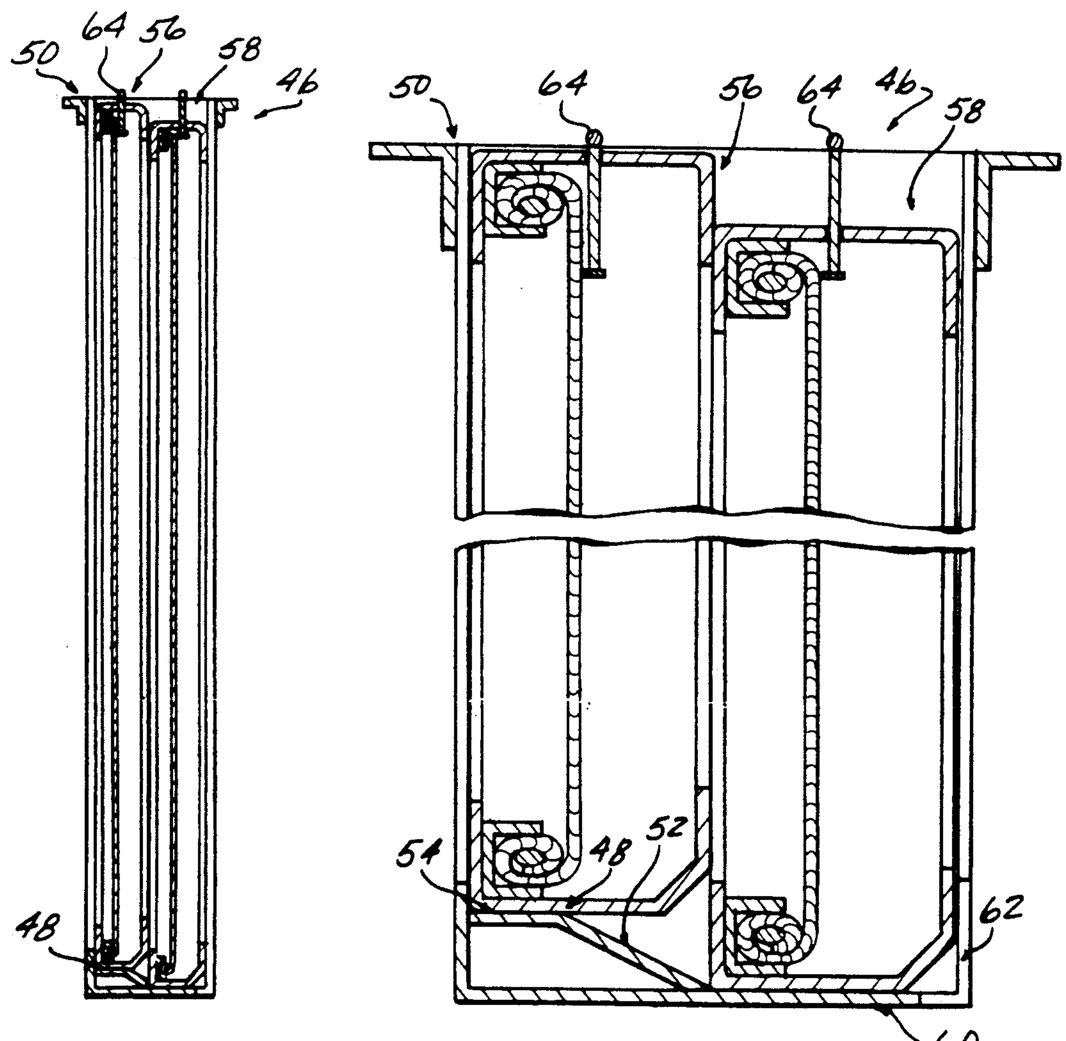
FIG-7
FIG-8

PUMP COMPARTMENT SCREENING ARRANGEMENT FOR A TANK

Cross Reference to Related Applications

This application is a continuation in part of Ser. No. 07/759,522 filed on September 13, 1991 now abandoned.

BACKGROUND OF THE INVENTION

This invention concerns a pump screening arrangement for preventing the inflow of debris to a liquid containing tank compartment having a liquid circulation pump installed therein. It is usual to install a screen as a partition in a sump tank separating the tank space wherein the pump is located from the rest of the tank. This prevents any debris which may fall into the tank from reaching the pump intake and clogging the pump or associated piping.

Such screens are commonly installed in channels on the tank sides so as to be removable for cleaning. However, when the screen or screens are pulled up, the debris falls off and into the tank, where it often gets into the pump compartment.

SUMMARY OF THE INVENTION

The present invention comprises a screening arrangement including a dual screen assembly in which a pair of screens are mounted, one in front of the other in a holder frame, which assembly can be installed within tank screen mounts. Each of the screens are individually removable from the holder frame so that the other can remain in place and catch any debris falling from the removed screen. The frame configuration allows the removed screen to be reinstalled on the pump side of the remaining screen, which is shifted outwardly in the frame as the first screen is reinstalled. This insures that debris never escapes into the pump compartment.

Each screen is fixed in a surrounding border and also includes a trough extending across the lower front, which acts as a debris collector to trap the debris falling from the screen as it is raised out of the holder frame.

In the preferred embodiment, a ramp is located at the pump side bottom of the screen holder, which assists in outward indexing the rear screen when the front screen is being replaced after cleaning.

DESCRIPTION OF THE DRAWINGS

FIG. 3 is an enlarged plan view of the dual screen assembly shown in FIGS. 1 and 2 and fragmentary view of the adjacent tank structure.

FIG. 4 is a view of the section 4—4 taken in FIG. 2.

FIG. 5 is a greatly enlarged fragmentary sectional view 5-5 of the upper portion of the screen assembly taken in FIG. 3.

FIG. 6 is a diagrammatic representation of the shifting of the individual screen units in the holder frame during removal of a screen for cleaning.

FIG. 7 is a sectional side elevational view of a preferred alternate embodiment of the screen arrangement according to the present invention.

FIG. 8 is an enlarged fragmentary view of the section of FIG. 7.

FIG. 9 is a fragmentary front view of a preferred alternate embodiment of the screen holder.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
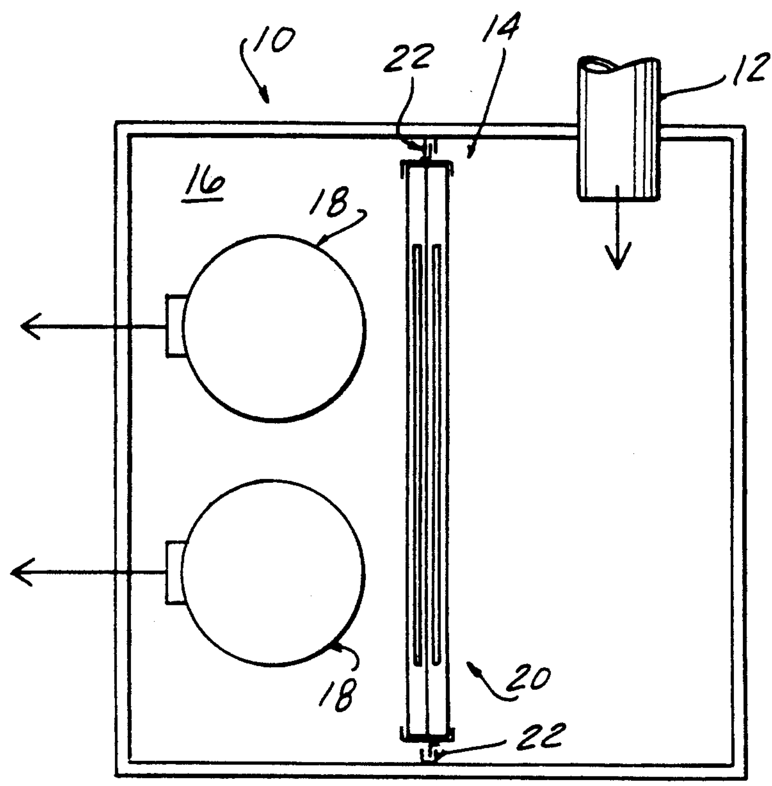
FIG. 1 is a plan view of a tank having a pump compartment formed by a screen arrangement according to the present invention.
Figure 2:
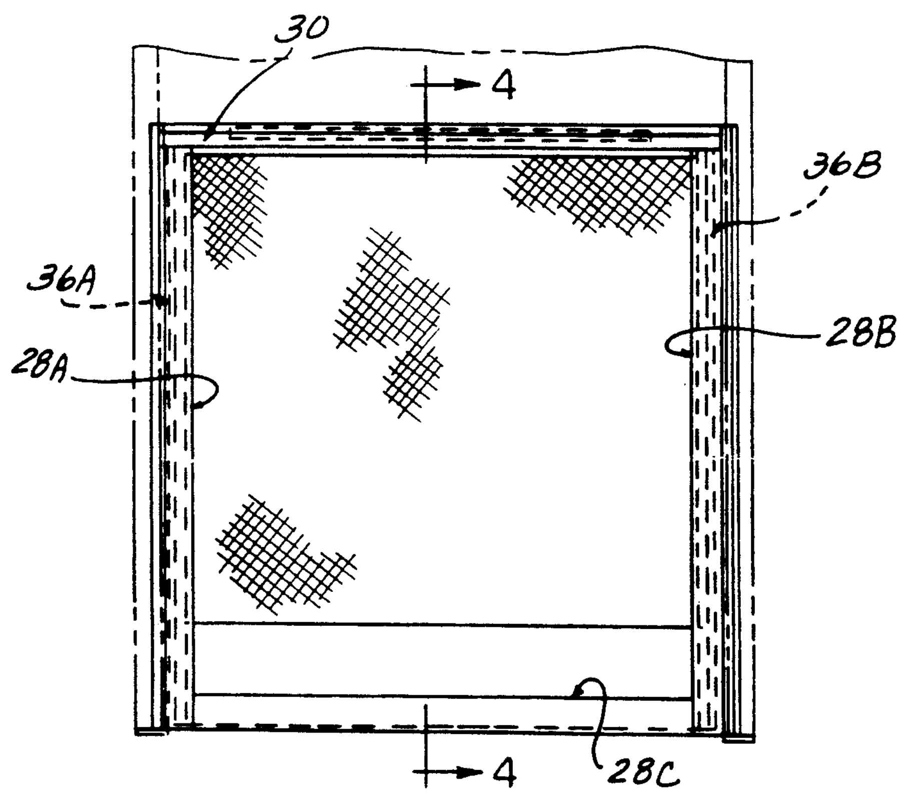
FIG. 2 is a front elevational view of a dual screen assembly incorporated in the screen arrangement shown in FIG. 1, with a phantom line depiction of the tank walls and screen mount.

FIG. 1 is a plan view illustration of an open topped tank 10 adopted to receive an inflow of liquid as from a pipe 12. The interior space 14 of the tank 10 is partitioned to form a pump compartment 16, which could have one or more pumps 18 located therein for pumping the liquid out of the tank.

The subdividing of the interior space of the tank 10 is accomplished by a screening arrangement comprised of a dual screen assembly 20 slidably received in mounting channels 22 welded to opposite sides of the tank 10.

The dual screen assembly 20 includes a rectangular holder frame 24 slidably receiving a pair of rectangular screens 26A, 26B aligned with each other and oriented with the plane thereof extending across the tank 10 to partition the same as described. The screens 26A, 26B are independently movable in and out of the holder frame 24.

The holder frame 24 is constructed on two sides and the bottom by three welded-together wide channel members 28A, 28B, 28C having sides providing retention walls of a width sufficient to accommodate both screens 26A, 26B with a clearance space therebetween. The holder frame 24 is open at the top, the side channel members 28A, 28B connected by angle pieces 30 welded thereto.

The side channels 28A, 28B and angle pieces 32 are received in tank channel mounts 22 to secure the holder frame 24 in position in the tank 10.

The pair of screens 26A, 26B each include a rectangular screen sheet 34A, 34B fixed within a screen frame formed by welded channel sides 36A, 36B, bottom 36C, and top 36D. Border channels 38A, 38B are welded to one side of each screen frame channel 36A, 36B, 36C, 36D and receive a rolled edge of each respective screen sheet 34A, 34B, which is welded therein.

A lifting tab 40A, 40B is welded to the top of the frame of each screen 34A, 34B.

The bottom channel 36C of each screen 34A, 34B has one side 42 extending further upwardly than the other side, forming a debris collecting trough 44 at the bottom of each screen 26A, 26B.

In use, the outer screen 34B (FIG. 6) can be lifted out of the holder frame 24 for cleaning, leaving the inside screen 34A in position to protect against any debris passing into the pumping compartment 16. Most or all of the debris falling from the screen sheet of the removed screen 34B will be collected in the trough 44.

The inside screen 34A is shifted to the outside as the cleaned screen 34B is replaced, as indicated, with the cycle repeated with the removal of screen 34A at the next screen cleaning. Thus, the pumping compartment 16 is always protected against the entrance of debris.

It is noted that the holder frame 24 can be retrofitted to existing single or multiple screen equipped tanks.

A preferred embodiment of the screen arrangement 46 is shown in FIGS. 7-9, which features a ramp support 48 located at the bottom of the pump side of the holder frame 50. The ramp support 48 includes a ramp portion 52 sloping down towards the outside.

A raised ledge portion 54 provides a rest for the pump side inner screen frame 56, slightly elevating the screen frame 56 relative to the outer screen frame 58.

When the outer screen frame 58 is removed for cleaning as in the above embodiment, the inner screen frame 56 is left in place to continue screening the flow to the pump compartment.

The outer, screen frame 58 is then replaced, but behind the inner screen frame 56, which is tilted forward in the holder frame 46. Insertion of screen frame 58 enables a camming over of screen frame 56, causing it to advance off the ledge portion 54, and onto the ramp surface 52. Once on the ramp surface 52, the weight of the screen frame 56 causes the bottom of the screen frame 56 to index outwardly, allowing space for completion of the insertion of the screen frame 58, now becoming the inner screen.

The forward bottom edge of each screen frame 56, 58 is beveled as shown to assist in insertion. The holder frame 46 is preferably modified in the preferred embodiment by cutting away the outer wall and a portion of the bottom of the bottom channel 60 in region 62 as shown in FIGS. 9 (and 8). This prevents debris from collecting in the bottom channel 60 of the holder frame 46 to avoid jamming.

One or more lifting handles 64 are provided in each screen frame 56, 58, received in slots so as to be able to drop down into the screen frames for storage, as shown on the left in FIG. 8, but can be raised as shown on the right for lift out.

I claim:

1. A screening arrangement for partitioning a liquid receiving tank to form a pump compartment therein protected against the entrance of debris, said screening arrangement comprising a screen assembly mounted to partition said tank and form said pump compartment, said screen assembly comprising:

- an open topped rectangular holder frame having a bottom and two side members configured to provide retention walls on either side thereof;
- a pair of screens slidably received in said holder frame within said retention walls and in aligned parallel relationship to each other, each of said screens independently slidable in and out of said holder frame and including a rectangular screen sheet and rectangular screen frame having said screen sheet fixed therein, whereby one of said screens away from said pump compartment can be removed for cleaning, leaving the other in place to insure continued protection against the entrance of debris into said pump compartment

2. The screening arrangement in claim 1 wherein each of said screen frames is formed with an open topped debris collecting trough extending across the bottom thereof on the side away from said pump compartment.

3. The screening arrangement of claim 1 wherein said holder frame has a retention projection extending down the outside of each side member and mounting means are affixed to the inside of each tank wall configured to receive a respective retention feature.

4. The screening arrangement of claim 1 wherein a lifting tab is affixed to the top of each screen frame.

5. The screening arrangement according to claim 1 further including a ramp support on the bottom of said holder frame below one of said screens, having a ramp surface extending from a point above said holder frame bottom down to the bottom thereby.

6. The screening arrangement according to claim 5 wherein said ramp support includes a horizontal ledge section supporting said one screen slightly above the other screen.

7. A method of screening a pump compartment of an open topped tank comprising the steps of:

- mounting an open topped holder frame in said tank on one side of said pump compartment;
- installing a pair of aligned screens in said holder frame so as to be independently movable in and out of said holder frame;
- periodically lifting out the screen in said holder away from said pump compartment for cleaning;
- shifting one screen closest to said pump compartment to the other side of said holder frame and installing said removed screen in said holder frame on the side adjacent said pump compartment, whereby said pump compartment is constantly protected against the entrance of debris.

8. The method of claim 7 further including the step of supporting said one screen closest to said pump compartment slightly above the other screen, and disposing a ramp surface below the bottom of said one screen and sliding said one screen down said ramp surface to cause said shifting thereof.

* * * * *